United States Patent

[11] 3,596,627

| [72] | Inventor | Carl E. Monk |
| | | 428 Southland Blvd., Louisville, Ky. 40214 |
| [21] | Appl. No. | 3,752 |
| [22] | Filed | Jan. 19, 1970 |
| [45] | Patented | Aug. 3, 1971 |

[54] PORTABLE WARNING DEVICE
10 Claims, 5 Drawing Figs.

[52] U.S. Cl. .................................................. 116/63 P,
40/125 N, 248/472, 350/97
[51] Int. Cl. ........................................................ E01f 9/10
[50] Field of Search .................................. 116/28, 63,
173, 174, 175; 40/125, 125 H, 125 I, 125 N;
350/97, 288; 24/81; 248/38—48, 33, 472, 474

[56] References Cited
UNITED STATES PATENTS

| 2,757,891 | 8/1956 | Gunderson | 248/33 |
| 3,161,720 | 12/1964 | Musichuk | 248/472 |
| 3,262,414 | 7/1966 | Monk | 116/28 |
| 3,343,778 | 9/1967 | Levine | 350/97 UX |

*Primary Examiner* — Louis J. Capozi

ABSTRACT: A portable warning device has a heavy base of steel rod formed into a polygon. The rod has a portion, extending into the polygon, to which is pivotally secured a reflector. The portion is spaced from one side of the polygon a distance sufficient to allow the reflector to assume a stored position wherein it lies between the portion and the polygon side substantially within the plane of the base.

PATENTED AUG 3 1971 3,596,627
INVENTOR
CARL E. MONK
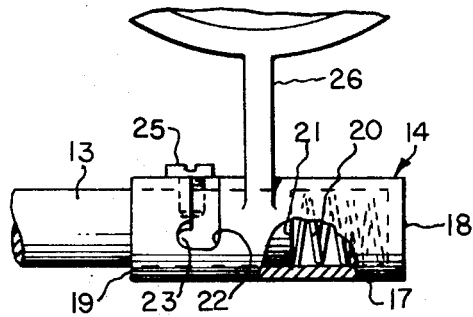
FIG. 3
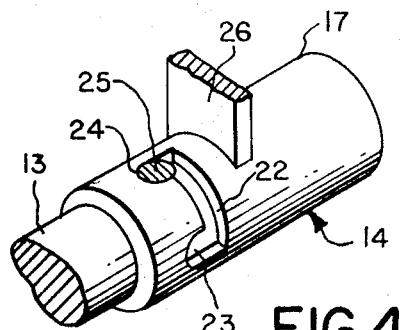
FIG. 4
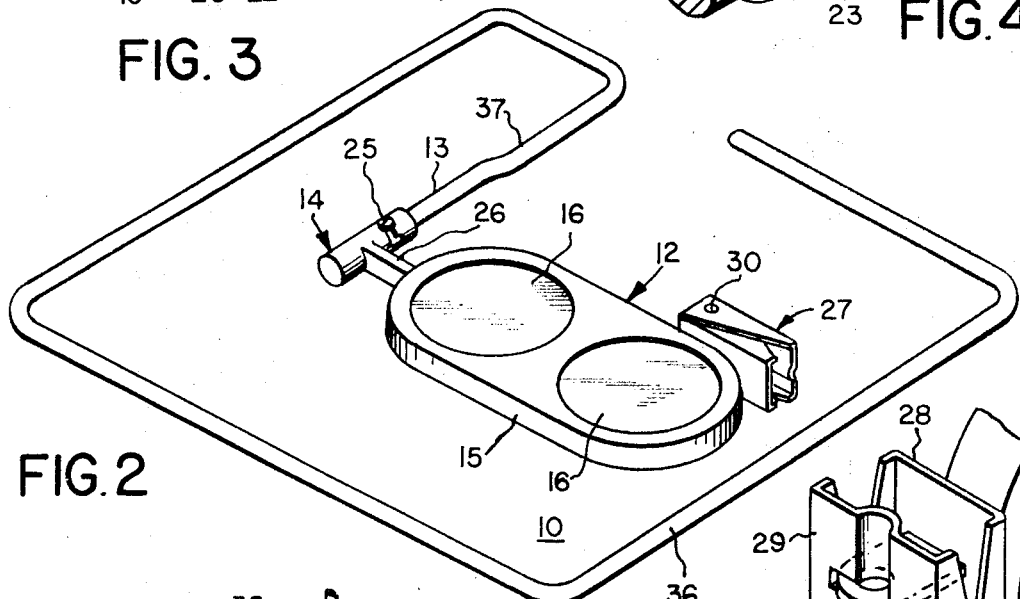
FIG. 2
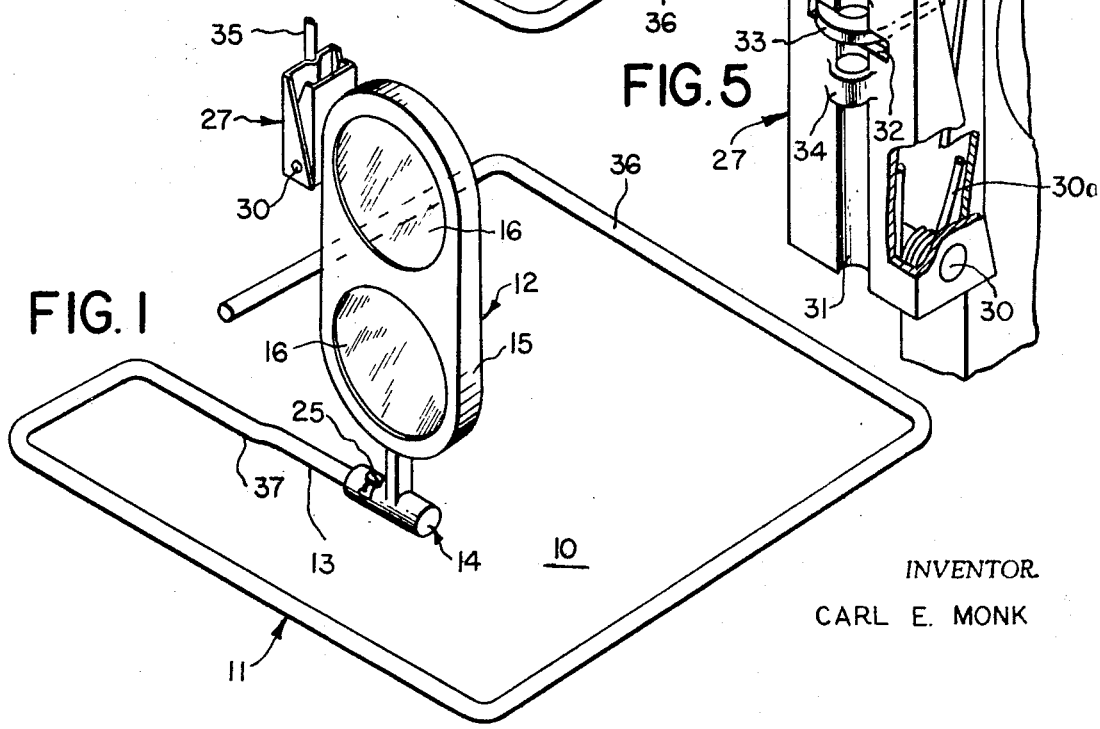
FIG. 1
FIG. 5

PORTABLE WARNING DEVICE

BACKGROUND OF THE INVENTION

It is common practice for the operators of commercial vehicles such as, for example, trucks, buses and trailer-trucks, to carry with them in their vehicle warning devices for use in the event the vehicle becomes disabled and it is necessary to park the vehicle at the side of the road. Appropriate warning devices include reflectors, flags and flares. With the advent of the interstate highway system, many of the roads now traveled by commercial vehicles have speed limits as high as 70 miles per hour for both automobiles and trucks. Vehicles traveling at these relatively high speeds create substantial air turbulence. Many of the portable warning devices now available will not withstand the turbulence when set up beside the right of way. As vehicles, and especially larger vehicles such as trucks and buses, pass these warning devices at speeds approaching 70 miles per hour, the devices are blown over and become ineffective to warn motorists subsequently passing by of the disabled vehicle. Thus, it would be advantageous to provide a warning device of the character referred to which will withstand the air turbulence created by passing vehicles without being blown over. Because these devices must be carried in the vehicle in order to be readily available in the event of a vehicular breakdown, it would be desirable to provide a device which is easily portable and stowable.

Accordingly, it is an object of this invention to provide an improved warning device, of the type referred to, which will withstand the air turbulence created by passing vehicles without being blown over.

It is another object of this invention to provide such a device which is easily portable and stowable.

It is another object of this invention to provide a warning device of the character described which is economical to manufacture and simple to operate.

SUMMARY OF THE INVENTION

Briefly state, in accordance with one aspect thereof, the present invention involves a portable warning device having a heavy base of metal rod formed into a polygon. The base includes a portion of the rod extending into the polygon. A reflector, or other warning means, is provided and is pivotally secured to the portion of the rod. The reflector is pivotal between an operative position wherein it is disposed generally perpendicular to the plane of the base and a stored position wherein it lies substantially within the plane of the base. The portion to which the reflector is pivotally secured is spaced from one of the sides of the polygon a distance at least as great as the length of the reflector whereby the reflector may assume a stored position wherein it lies between the portion to which it is pivotally secured and the polygon side.

BRIEF DESCRIPTION OF THE DRAWINGS

While the specification concludes with claims particularly pointing out and distinctly claiming the subject matter which is regarded as the invention, it is believed the invention will be better understood from the following description of the preferred embodiment taken in connection with the accompanying drawing in which:

FIG. 1 is a perspective view of the present invention showing the reflector in its operative position;

FIG. 2 is a view similar to that of FIG. 1 but showing the reflector in its stored position;

FIG. 3 is a detailed sectional view of the means pivotally securing the reflector to the base;

FIG. 4 is a detailed perspective view showing the means which pivotally secures the reflector to the base; and FIG. 5 is a detailed perspective view showing the means to secure and support a warning flag or a spiked fuse.

DESCRIPTION OF THE PREFERRED EMBODIMENT

Referring now to the drawing, and initially to FIG. 1 thereof, there is illustrated the portable warning device 10 which includes a base 11 and a warning means such as reflector 12. Reflector 12 is pivotally secured to a portion 13 of base 11 by a pivot means 14. As will be more fully discussed hereinafter, reflector 12 is pivotal between an operative position as illustrated in FIG. 1, wherein reflector 12 is disposed substantially perpendicular to the plane of base 11, and a stored position, as illustrated in FIG. 2, wherein reflector 12 is disposed substantially within the plane of base 11.

Reflector 12 is provided with a frame 15, which may be formed of any suitable rigid and weather-resistant material such as aluminum. Frame 15 supports a pair of reflector elements 16 which may be of conventional plastic or glass construction such that when the headlights of an approaching vehicle shine on the elements, they will reflect these light rays. In the preferred form of the present invention, reflector elements 16 are red in color in accordance with standard practice. Reflector elements 16 are visible from both sides of frames 15 so that they will reflect lights from either direction.

Base 11 comprises a metal rod bent to form a polygon with portion 13 integral with the rod and extending into the polygon. As mentioned above, a primary object of the present invention is to provide a warning device which will withstand the air turbulence created by vehicles passing by at a high rate of speed. This is achieved by making the dimensions of the polygon sufficiently large to provide a relatively broad and stable base. In the preferred form of the present invention, the polygon forms a square with the sides of the square being approximately 12 inches long. Moreover, the base is formed from solid steel rod which gives the base, including portion 13, a total weight of approximately 3½ pounds. With this heavy weight and relatively large area base, the device is very stable when set up along the right of way of a highway.

Referring now to FIGS. 3 and 4, the details of the pivot means 14 will be described. It can be seen that pivot means 14 comprises a tubular element 17 having a closed end 18 and an open end 19. The portion 13 of base 11 extends into element 17 through open end 19 and terminates short of closed end 18. A spring 20 is disposed to bear against the terminal end 21 of portion 13 and against closed end 18 of element 17. In this manner, spring 20 urges element 17 to the right as viewed in FIG. 3. Element 17 is provided with a generally C-shaped slot 22 which has notches 23 and 24. A pin or screw 25 is rigidly secured to portion 13 and projects out through slot 22. The diameter of pin 25 adjacent the outer surface of portion 13 is substantially the same as the diameter of notches 23 and 24.

With the foregoing arrangement, element 17 can be depressed axially with respect to portion 13, by manually overcoming the biasing force of spring 20, and then rotated relative to portion 13 to move reflector 12 between its operative position of FIG. 2. It is to be noted that reflector 12 is secured in either of these positions by the interaction of pin 25 with notches 23 and 24. Pin 25 is disposed in notch 24 when reflector 12 is in its operative position and pin 25 is disposed in notch 23 when reflector 12 is in its stored position. In order to facilitate manual manipulation of element 17, the outer surface is knurled. Frame 15 is rigidly interconnected with element 17 by a leg 26.

In many cases, it is advisable, or required by statue, to set out a flag or flare along with a reflector when a vehicle becomes disabled. The present invention provides means to secure and support either a flag or a flare of the fusee type. The use of a spiked fusee may be desirable during inclement conditions such as times when fog is present and visibility is limited. This means includes a clamp 27 which can best be seen in detail in FIG. 5. Clamp 27 includes a pair of plates 28 and 29 pivotally interconnected by means of a pin 30. Plate 28 is rigidly secured to frame 15 by any suitable means such as, for example, riveting or welding. Plate 29 is pivotal about pin 30 relative to plate 28 and may be provided with means, such as spring 30a, for biasing it relative to plate 28. Plate 29 includes an elongated groove 31 which is adapted to receive a flagstaff or the spike element which protrudes from one end of a fusee flare. Extending across groove 31 near the distal end of plate 29 is a slot 32. A stationary element 33 is rigidly secured to plate 28 and extends through slot 32. Element 33 may either be generally U-shaped in configuration or can be a platelike element having an opening therethrough to receive the aforementioned flagstaff or fusee spike. In either event, the flagstaff is inserted through element 33 in groove 31 so as to be wedged between plate 29 and element 33 under the influence of the spring 30a which tends to bias plate 29 about pin 30. A finger 34 may be lanced out of plate 29 to provide further stability of the flagstaff disposed within groove 31. For purposes of illustration, a flagstaff 35 is illustrated in FIG. 1 as being supported by clamp 27. It is to be noted that plate 29 extends beyond element 33 for a substantial distance which approximates, in the preferred form of the present invention, one-half inch. With this arrangement, the flagstaff is inserted through element 33 until the flag touches element 33. Thus, when plate 29 is released, approximately one-half inch of flat material is wedged between the flagstaff and plate 29. This wedging effect prevents the flag from being blown from the flagstaff. This can be significant since most flags of this type available today are not securely fastened to the staff.

It is to be noted that portion 13 is spaced from one of the sides 36 of base 11 a distance sufficient to allow reflector 12 and clamp 27 to lie between portion 13 and side 36. With this arrangement, the warning device of the present invention provides a relatively narrow assembly for storing purposes. In other words, when reflector 12 is in the stored position, the entire assembly comprises cubic dimensions of approximately 1 ft. × 1 ft. × 2 in. A device with these dimensions can easily be stored in a vehicle.

It should also be noted that portion 13 has a slight offset 37 so that the terminal end of portion 13 is slightly elevated above the plane of the remainder of the base. This provides clearance for pivot means 14 so that when the warning device is set on the ground adjacent the right of way, a stable base is provided as defined by the outer perimeter of base 11.

It should now be apparent that the present invention provides a portable warning device which will withstand the air turbulence created by passing vehicles without being blown over and which is easily portable and stowable. Moreover, the device is relatively simple in construction and thus economical to manufacture and simple to operate. The ability of the device to withstand air turbulence created by passing vehicles results primarily from the construction of the base which, as noted above, in the preferred form of the present invention, comprises one-half inch diameter steel rod formed into a square approximately 12 inches long on each side. This steel rod provides stability due to its weight of approximately 3½ pounds and to the relatively large base area defined by the 12-inch square. Of particular significance is the ease with which the device may be stowed despite the relatively large and massive base.

As will be evident from the foregoing description, certain aspects of the invention are not limited to the particular details of construction of the example illustrated, and it is contemplated that other modifications, applications or variations will occur to those skilled in the art. It is therefore intended that the appended claims shall cover such modifications, applications and variations as do not depart from the true spirit and scope of the invention.

What I claim as new and desire to secure by Letters Patent of the United States is:

1. A portable warning device comprising:
    a heavy base of metal rod formed in a polygon;
    said base including a portion of said rod extending into the polygon;
    a reflector;
    means to pivotally secure said reflector to said portion;
    said reflector being pivotal between an operative position wherein it is disposed generally perpendicular to the plane of said base and a stored position wherein it is disposed substantially within the plane of said base;
    said portion being spaced from one of the sides of the polygon a distance at least as great as the length of said reflector whereby when said reflector is in said stored position it will lie between said portion and said polygon side.

2. The invention of claim 1 wherein said metal rod is steel.

3. The invention of claim 1 wherein said means to pivotally secure said reflector to said portion comprises a tubular element having a closed end and an open end, said portion extends into said open end, a spring disposed between the end of said portion and said closed end of said tubular element, a C-shaped slot in said tubular element and means secured to said portion and extending through said slot.

4. The invention of claim 1 further comprising means, carried by said reflector, to secure and support a flag.

5. The invention of claim 4 wherein said means to secure and support a flag comprises a spring-biased pivotal plate having at least one slot therein and a relatively stationary element extending through said slot and adapted to receive and secure a flagstaff between said element and said pivotal plate.

6. The invention of claim 5 wherein said pivotal plate extends beyond said stationary element whereby the flag will be wedged between said plate and the flagstaff.

7. The invention of claim 1 wherein said polygon is a rectangle and said portion is disposed generally parallel to said one of the sides of said polygon.

8. The invention of claim 1 wherein said portion is elevated slightly above the plane of the remainder of said base.

9. A portable warning device comprising:
    a heavy base of metal rod formed in a polygon;
    said base including a portion of said rod extending into said polygon;
    clamp means to secure and support a flag or fusee flare including a spring-biased pivotal plate having at least one slot therein and a relatively stationary element extending through said slot and adapted to receive and secure a flagstaff or fusee spike between said element and said pivotal plate; and,
    means to pivotally secure said clamp means to said portion whereby said clamp means can be pivoted between an operative position and a stored position relative to said base.

10. The invention of claim 9 wherein said pivotal plate extends beyond said stationary element whereby the flag will be wedged between said plate and the flagstaff.